(12) United States Patent
Hudelmaier

(10) Patent No.: US 6,244,477 B1
(45) Date of Patent: Jun. 12, 2001

(54) DEVICE FOR POURING OUT CONCRETE

(75) Inventor: Gerhard Hudelmaier, Ulm (DE)

(73) Assignees: Ulrike Hudelmaier; Jorg Hudelmaier; Gotz Hudelmaier, all of Ulm (DE)

( * ) Notice: Subject to any disclaimer, the term of this patent is extended or adjusted under 35 U.S.C. 154(b) by 0 days.

(21) Appl. No.: 09/180,381

(22) PCT Filed: May 7, 1997

(86) PCT No.: PCT/EP97/02340

§ 371 Date: Apr. 9, 1999

§ 102(e) Date: Apr. 9, 1999

(87) PCT Pub. No.: WO97/42382

PCT Pub. Date: Nov. 13, 1997

(30) Foreign Application Priority Data

May 7, 1996 (DE) ............................................. 196 18 316

(51) Int. Cl.[7] .................................................. E04G 21/04
(52) U.S. Cl. .......................... 222/527; 222/526; 193/2 R; 193/25 R; 193/25 C
(58) Field of Search .................................. 222/526, 527; 193/25 R, 2 R, 16, 25 C

(56) References Cited

U.S. PATENT DOCUMENTS

| | | | |
|---|---|---|---|
| 1,381,574 | * 6/1921 | Ludlam | 193/25 E |
| 1,442,521 | * 1/1923 | Case | 193/30 |
| 3,428,156 | * 2/1969 | Charyn et al. | 193/25 R |
| 3,860,175 | 1/1975 | Westerlund et al. | 239/165 |
| 3,949,850 | 4/1976 | Schumm | 193/25 |
| 4,277,214 | * 7/1981 | Mahle et al. | 193/16 |
| 4,462,548 | * 7/1984 | Egli | 239/225 |
| 5,372,229 | * 12/1994 | Leibling | 193/30 X |
| 5,601,181 | * 2/1997 | Lindhorst | 193/25 R |

FOREIGN PATENT DOCUMENTS

| | | |
|---|---|---|
| 565 280 | 3/1958 | (BE) . |
| 39 09 212 | 9/1990 | (DE) . |
| 0 066 724 | 12/1982 | (EP) . |

OTHER PUBLICATIONS

Patents Abstracts of Japan, vol. 10, No. 94, Apr. 1986.

* cited by examiner

*Primary Examiner*—Kenneth Bomberg
(74) *Attorney, Agent, or Firm*—Nilles & Nilles, S.C.

(57) ABSTRACT

A device for discharging concrete having a flexible hose which is connected to a concrete supply line, preferably a concrete supply line of a concrete pump, the hose is provided with an input end which is associated with the supply line and through which the concrete conveyed through the supply line enters the hose and an output end through which the concrete conveyed through the hose leaves the hose for the purpose of discharge. The hose is adapted to be bent in at least one swiveling plane between a substantially straight initial position and a curved position, and also has a swivel for moving the hose from its straight initial position to its curved position. The swivel has at least one drawer and/or pusher which extends, at least at the initial position of the hose, outside of the longitudinal central axis of the hose and at least indirectly between a first bearing associated with the output end of the hose and connected to the hose and a second bearing associated with the input end and fixed relative to the input end. At least one actuator is provided which is operatively connected to the drawer or pusher in such a way that the distance between the first and second bearings can be reduced, whereby the hose can be moved from its initial position to its curved position.

22 Claims, 6 Drawing Sheets

DEVICE FOR POURING OUT CONCRETE

BACKGROUND OF THE INVENTION

1. Field of the Invention

The present invention refers to a device for discharging concrete, comprising a flexible hose, which is connected to a concrete supply line, preferably a concrete supply line of a concrete pump, said hose being provided with an input end which is associated with the supply line and through which the concrete conveyed through the supply line enters the hose and an output end through which the concrete conveyed through the hose leaves said hose for the purpose of discharge, said hose being adapted to be bent in at least one swivelling plane between a substantially straight initial position and a curved position, and further comprising a swivelling means for moving the hose from its straight initial position to its curved position, said swivelling means comprising at least one drawing and/or pushing means which is effective in the swivelling plane and which extends, at least at the initial position of the hose, outside of the longitudinal central axis of the hose and at least indirectly between a first bearing associated with the output end of the hose and fixedly connected to the hose and a second bearing associated with the input end and fixed relative to said input end at least in the drawing and/or pushing direction of the drawing and/or pushing means, and at least one actuating means being provided, which applies a drawing and/or pushing force to the drawing and/or pushing means and which is operatively connected to said drawing and/or pushing means in such a way that the distance between the first and second bearings can be reduced by actuating the respective actuating means, whereby the hose can be moved from its initial position to its curved position.

2. Description of the Related Art

Such a device is known e.g. from DE-A-2752605. This device is provided with a piston-cylinder unit by means of which the hose can be moved from its initial position to its curved position. Due to the fact that the output end can be swivelled relative to the input end, the concrete can be discharged such that it is applied to the areas aimed at without moving the concrete supply line itself. However, a device of this type proves to be disadvantageous insofar as the possible swivelling angle is strongly limited by construction-dependent circumstances. The swivelling angle is limited by the distance of the piston rod and of the piston-cylinder unit from the hose. For enlarging the swivelling angle, the distance between the piston-cylinder unit and the hose has to be enlarged. This, however, results in a substantial increase in the physical size and in the fact that a larger number of components is required so that the weight of the device will be increased; this is disadvantageous, especially in the case of long, projecting supporting arms. In addition, such a device does not suffice to fulfill all the requirements which have to be satisfied for operating a concrete pump.

OBJECTS AND SUMMARY OF THE INVENTION

Hence, it is the object of the present invention to further develop a device of the type mentioned at the start in such a way that it is easy to produce, has the lowest possible weight and the smallest possible physical size as well as the largest possible effective swivelling angle of the output end of the hose. In addition, it should be adapted to be used more universally.

According to the present invention, this object is achieved by the features that the hose is adapted to be bent in at least two swivelling planes which are arranged at an angle relative to one another and that at least two drawing and/or pushing means are provided, which are effective in the respective swivelling planes, said drawing and/or pushing means being flexible.

This solution is simple and advantageous insofar as the device can be provided with a structural design of such a nature that it has a comparatively low weight. In addition, the number of components required is smaller than in the case of conventional solutions, whereby the device can be produced more easily. The device can now also be provided with a very compact structural design and, in comparison with conventional solutions, larger swivelling angles of the output end can be achieved. Furthermore, the concrete pump can be used more universally due to the possibility of swivelling the hose end in at least two swivelling planes.

In this connection, it may prove to be advantageous when the swivelling planes include a right angle.

At least one of the first or second bearings can be arranged in spaced relationship with the respective associated input end or output end in an advantageous manner. This offers the possibility of causing the hose to bend in different curvatures, e.g. an S-shaped curvature.

In accordance with an advantageous further development of the present invention, the actuating means can be provided between one of the bearings and the drawing and/or pushing means. This permits an even more compact structural design of the device.

In this connection, it may prove to be advantageous when the respective actuating means is provided between the second bearing and the drawing or pushing means.

In order to obtain a structural design which is as simple and as reliable as possible, it may prove to be advantageous when the respective actuating means is implemented as a piston-cylinder unit.

According to an advantageous further development of the present invention, also the respective second bearing can be connected to the hose. This offers the possibility of providing the device independently of the supply line, or of providing it instead of a hose which is not equipped with a device according to the present invention. This offers the possibility of retrofitting old concrete pumps.

It may also prove to be advantageous to fasten the respective actuating means to the hose and to connect it to one of the bearings of the drawing and/or pushing means. This can be advantageous especially for retrofitting old concrete pumps, since, depending on the spatial conditions, the actuating means can be provided either at the first or at the second bearing.

In accordance with an advantageous further development of the present invention, it may be of advantage when the respective drawing and/or pushing means extends parallel to the longitudinal axis of the hose at the initial position of the hose. In addition, it may prove to be advantageous when the respective first bearing is arranged laterally of and in spaced relationship with the longitudinal axis of the hose. It may also be advantageous when the respective second bearing is arranged laterally of and in spaced relationship with the longitudinal axis of the hose.

In accordance with an advantageous further development of the present invention, it may also prove to be of advantage when additional drawing and/or pushing means are provided, the bearings being then arranged such that they are distributed over the circumference of the hose. This offers the possibility of bending the hose into different directions, and this will permit a better distribution of the concrete discharged.

In this connection, it may prove to be particularly advantageous when at least two drawing and/or pushing means are provided, which, at least at the initial position of the hose, are arranged in opposed relationship with each other relative to the longitudinal axis of the hose. This offers the possibility of achieving swivelling angles of 180° or more in one plane.

In accordance with an advantageous further development of the present invention, three drawing or pushing means can be provided, which, at the initial position of the hose, are arranged such that they are uniformly distributed about the longitudinal axis of the hose, and the hose can be adapted to be swivelled in several swivelling planes. The device can be used even more universally in this way.

A further advantageous embodiment of the present invention is so conceived that, at the initial position, four drawing and/or pushing means can be arranged such that they are uniformly distributed about the longitudinal axis of the hose, the drawing and/or pushing means being arranged in pairs essentially in the swivelling planes. This again serves to achieve a better distribution of the concrete discharged by the hose.

In order to provide the device with a structural design which is as compact and as simple as possible, the respective first bearings can be attached to a first fastening ring which surrounds the hose and which is secured thereto, the respective drawing and/or pushing means being fixed in said bearings. In this connection, it may also be advantageous when the respective second bearings are attached to a second fastening ring, which is fixed relative the hose, and when the respective actuating means rest on the second fastening ring.

In addition, it may also prove to be advantageous when the second fastening ring is provided with guide means in which the drawing and/or pushing means are guided such that they are adapted to be moved relative to the fastening ring. The drawing and/or pushing means can be guided accurately in this way.

In accordance with an advantageous embodiment, the guiding effect can be produced by means of rollers, the drawing and/or pushing means being deflected by said rollers in certain sections thereof parallel to the drawing and/or pushing direction of the piston-cylinder unit. This will prevent the drawing and/or pushing means from getting jammed in the guide means.

In accordance with an advantageous further development of the present invention, the device can also be provided with a rotational joint with the aid of which the hose can be swivelled about its axis of symmetry relative to the supply line. It is thus possible to swivel the output end on a circular path up to 360° in the deflected condition of the hose. This will improve the distribution of the concrete to be discharged still further.

In accordance with another further development of the present invention, the drawing and/or pushing means can be guided in the wall of the hose. This will permit an even more compact structural design of the device. In addition, the swivelling means will be prevented from getting dirty.

It may also be of advantage when the drawing and/or pushing means are implemented as drawing force-transmitting steel ropes. Furthermore, it may prove to be advantageous when the drawing and/or pushing means are implemented as joint rods, preferably as Cardan joints, transmitting drawing and pushing forces.

BRIEF DESCRIPTION OF THE DRAWINGS

In the following, the present invention will be explained in detail on the basis of embodiments.

DESCRIPTION OF THE PREFERRED EMBODIMENTS

Figure 1:
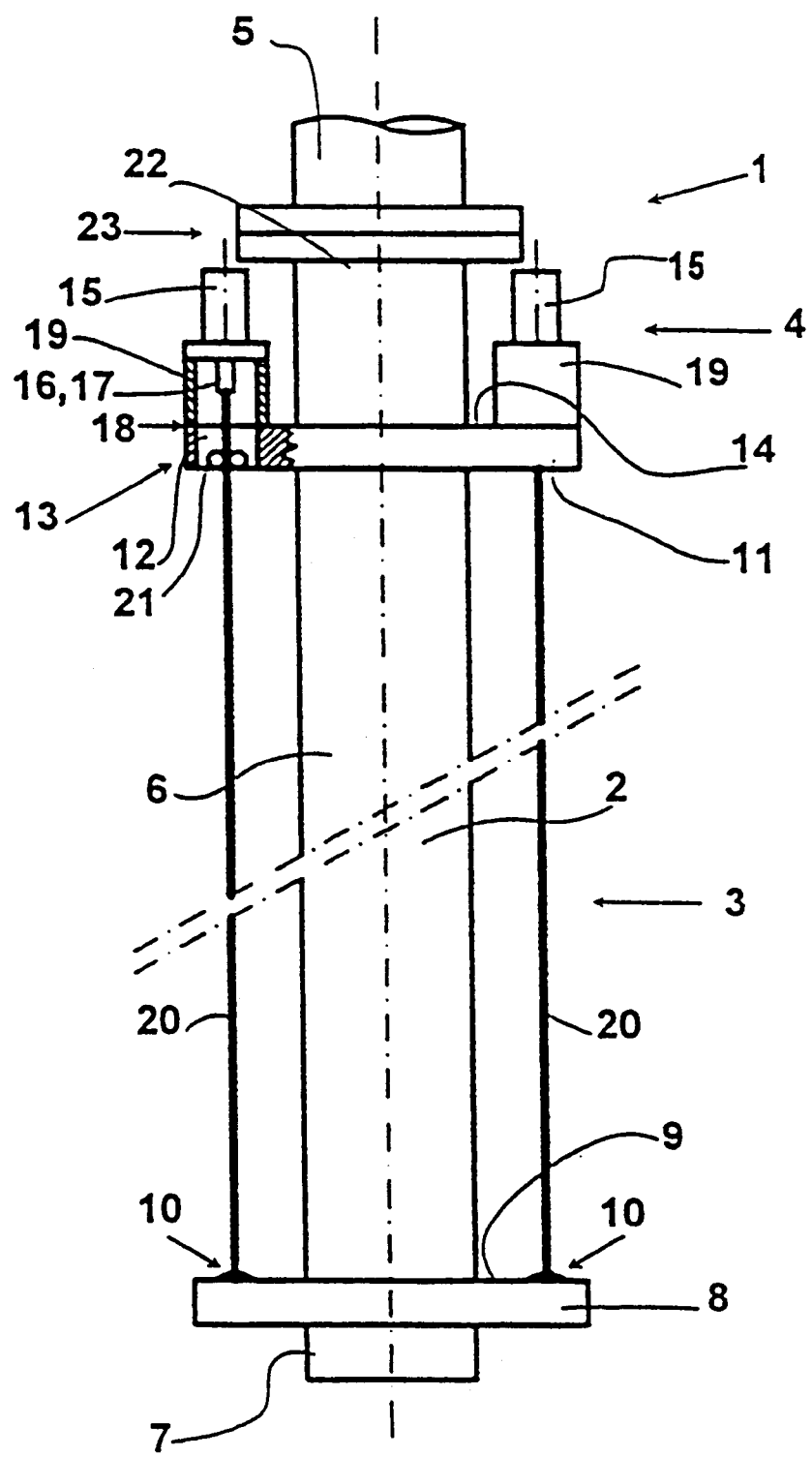
FIG. 1 shows a view of a first embodiment of the device according to the present invention at an initial position, part of said figure being a sectional view.

FIG. 1 shows a first embodiment of the device 1 according to the present invention comprising a hose 2, a swivelling means 3 and actuating means 4.

The device 1 is intended to be attached to the end of a concrete supply line 5, a section of which is shown in the drawing and which belongs to a concrete pump, which is not shown. The concrete supply line 5 of a concrete pump is normally held on a supporting arm, which is not shown. It is therefore also imaginable to fasten the device 1 to this supporting arm.

The hose 2 of the device 1 is flexible and is provided with an input end 6 which is associated with the supply line 5 and through which the concrete conveyed through said supply line 5 enters the hose 2, and with an output end 7 which is opposed to the input end 6 and through which the concrete conveyed through the hose 2 leaves said hose 2 for the purpose of discharge. In order to guarantee the necessary flexibility of the hose 2, said hose may consist of rubber-elastic material, textile-like materials, metal braids or plastic. It is also imaginable to implement the hose 2 such that it is composed of individual segments; in this case, the individual segments may consist e.g. of metal or plastic. In principle, any material is suitable, which permits a flexible structural design of the hose. The cross-section of the hose 2 is preferably ring-shaped.

At the output end 7, a first fastening ring 8 is provided, which is connected to the hose 2. On the side 9 facing the input end 6, there are two first bearings 10. These first bearings 10 are arranged laterally of the axis of symmetry of the hose 2 which is essentially tubular when it occupies its initial position. The two first bearings 10 are arranged such that, when seen relative to the axis of symmetry of the hose 2, they are opposed to one another and arranged in spaced relationship with said axis of symmetry.

The input end 6 has associated therewith a second fastening ring 11 which is provided with two openings 12. The openings 12 each constitute part of a guide means 13. On the side 14 associated with the supply line 5, there are two piston-cylinder units 15 with drawbars 16 having end sections 17 which face the output end 7, said piston-cylinder units 15 being associated with the respective openings 12. The piston-cylinder units 15 rest on the second fastening ring 11 via sleeves 19 defining second bearings 18. The second fastening ring 11 and the sleeve 19 and the piston-cylinder units 15 are respectively interconnected via screw connections, which are not shown.

Between the first bearings 10 and the second bearings 18, respective draw means 20 are provided in the form of steel ropes. One end of the draw means is directly connected to the first bearings and the other end is indirectly connected to the bearings 18 via the end sections 17 of the piston rods 16 of the piston-cylinder units. The draw means 20 preferably consist of steel ropes. It is, however, also imaginable to use braided ropes, plastic cables or chains. In addition, the draw means can be implemented after the fashion of Bowden cables. Alternatively, it is imaginable to use pushing members or pushing rods which are articulated on one another.

The two draw means 20 are guided through the respective openings 12, the rollers 21 being provided in pairs in said openings 12; said rollers 21 deflect the draw means 20 at any position of the hose 2 in such a way that the end facing the drawbar 16 is in alignment with said drawbar 16. In this way, transverse forces are prevented from being introduced in the piston-cylinder units 15.

The second fastening ring 11 is fixedly connected to a connecting piece 22 which constitutes part of the concrete supply line 5. The connecting piece 22 is connected to the rest of the concrete supply line 5 by a rotating means 23 in a flangelike manner in such a way that said connecting piece 22 is rotatable about the longitudinal axis thereof together with said second fastening ring 11 and the hose 2. The rotary drive is effected hydraulically and is not shown in detail.

Also the piston-cylinder units 15 are driven hydraulically, said drive being not shown in detail either. The draw means 20 are fastened to the first bearings 10 and the end sections 17, respectively, in a manner which is well-known to the person skilled in the art, e.g. by means of screw clips or hooks and lugs, said fastening means being, however, not shown in detail for the sake of clarity.

The hose 2 is in alignment with the connecting pieces 22 and the part of the concrete supply line 5 following said connecting piece 22. The connection between the connecting piece 22 and the hose 2 is covered by the second fastening ring 11. The hose 2 can, for example, also be connected to the second fastening ring 11.

In the following, the mode of operation of the present invention will. be explained in detail.

By means of a concrete pump, not shown, concrete is pumped through the concrete supply line 5, the connecting piece 22 and the hose 2, the concrete being discharged at the output end 7 of the hose 2.

Figure 2:
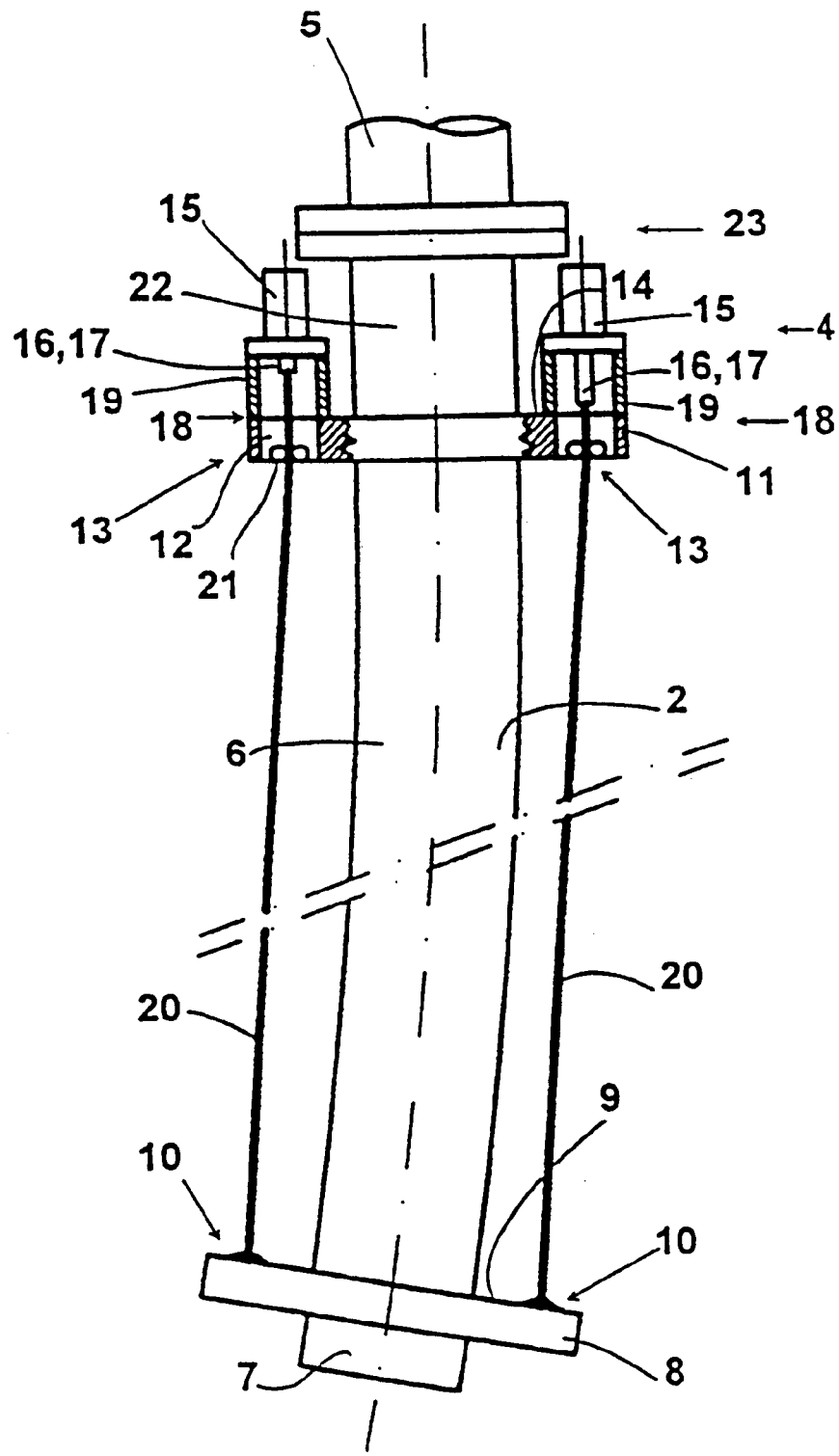
FIG. 2 shows the device according to FIG. 1 in the deflected condition.

At an initial position, the hose 2 is essentially tubular and in alignment with the connecting piece 22 and, at least in certain sections thereof, with the concrete supply line 5. When the concrete discharged through the output end 7 is to be uniformly distributed over a surface, the hose 2 can be moved from its initial position to a curved position, as can be seen from FIG. 2, by actuating the draw means 20. At this curved position, the concrete is discharged into an area which is different from the area acted upon when the hose 2 is at its initial position. The hose 2 cannot only assume the position shown in FIG. 2 but also any intermediate position.

For moving the hose 2 from its initial position to the curved position, the drawbar 16 of one of the piston-cylinder units 15 is drawn back, whereby the distance between the first bearing 10 and the second bearing 18 is reduced, i.e. one of the draw means 20 is drawn back in the direction of the second fastening ring, whereby the hose 2 is caused to bend. The drawbar 16 of the other piston-cylinder unit is extended to a corresponding extent so that the hose 2 is not prevented from bending.

Depending on the stroke lengths of the drawbars 16, the output end 7 of the hose 2 can be moved such that a swivelling angle of approx. 180° or more is covered, provided that swivelling takes place at both sides of the axis of symmetry of the hose 2.

In order to permit the discharged concrete to be distributed even more effectively, the output end 7 can be moved along a circular path with the aid of the rotating means 23 in the deflected condition of the hose 2.

In comparison with conventional solutions, the device according to the present invention can be produced in a simple manner, it has a low weight and it requires only little space.

By attaching e.g. a flange to the rotating means 23, it is imaginable to retrofit also already existing concrete pumps with said device 1.

In the following, a second embodiment will be described on the basis of an example.

Figure 3:
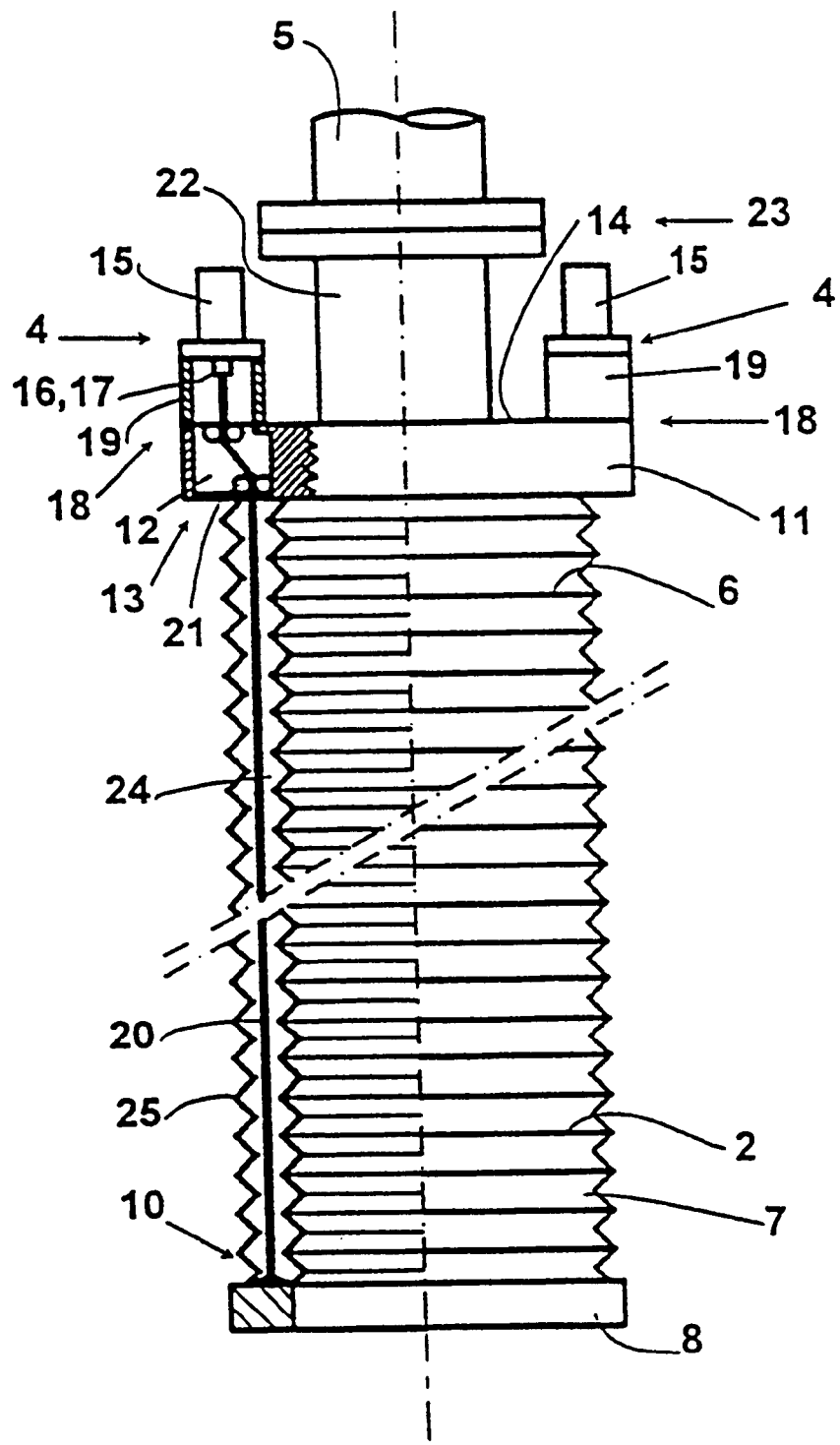
FIG. 3 shows a second embodiment of the device according to the present invention in the non-deflected condition, part of said figure being a sectional view.
Figure 4:
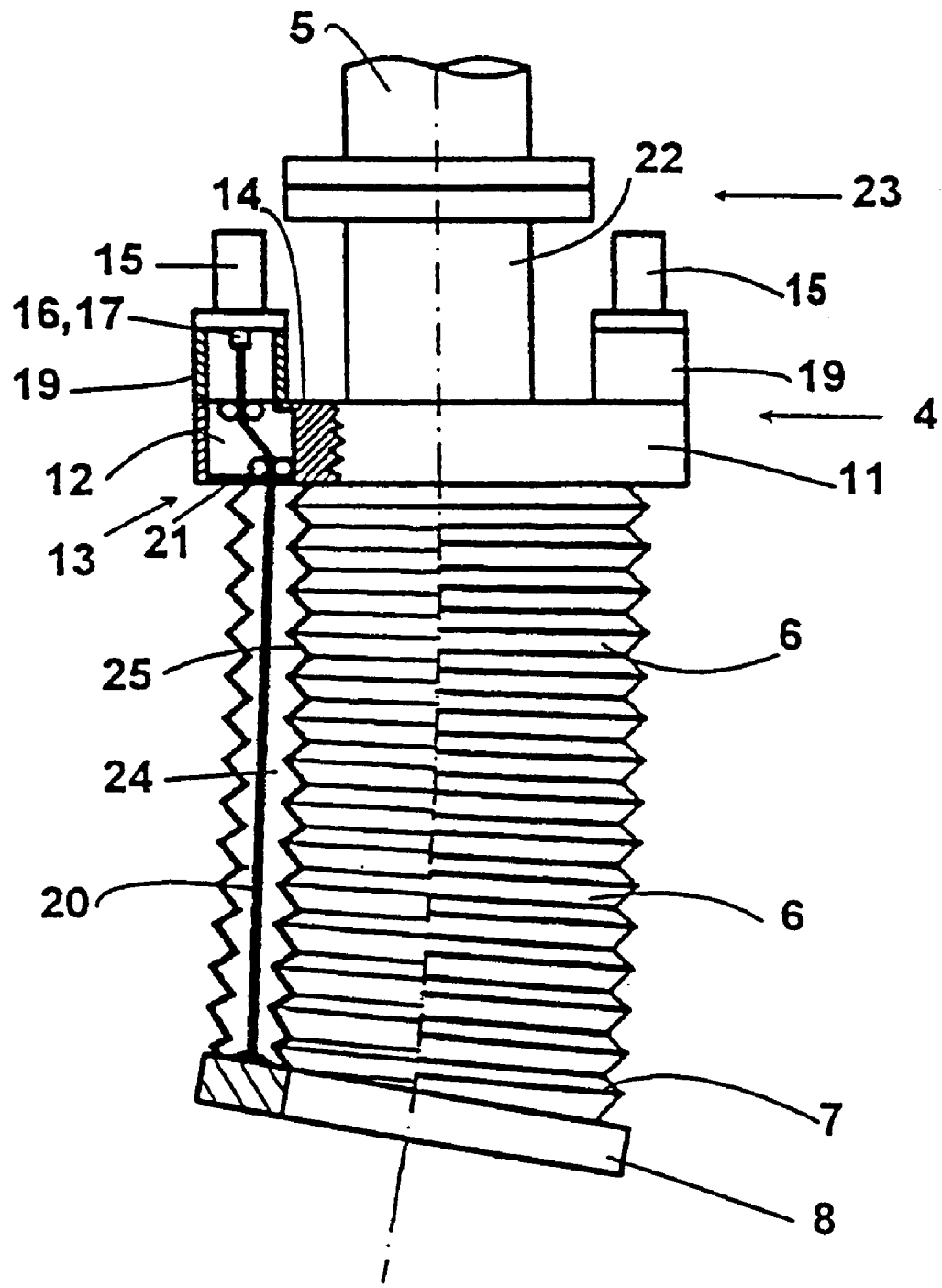
FIG. 4 shows the device according to FIG. 3 in the deflected condition.

The second embodiment corresponds essentially to the device according to the first embodiment, but the draw means 20 are guided in passages 24 formed in the wall 25 of the hose 2. In addition, a second pair of rollers 21 is provided for deflecting the draw means 20 in a suitable manner, as can be seen from FIG. 3. In order to make the hose 2 more flexible, it is implemented in the form of a corrugated bellows. In the present example, the passages 24 are created by two corrugated bellows which are inserted one into the other and the walls 25 of which define the passage 24.

The mode of operation of the second embodiment of the present invention corresponds to the mode of operation of the first embodiment of the present invention.

Alternatively, it is imaginable to provide additional draw means with the aid of which the hose can be deflected in several planes.

Figure 5:
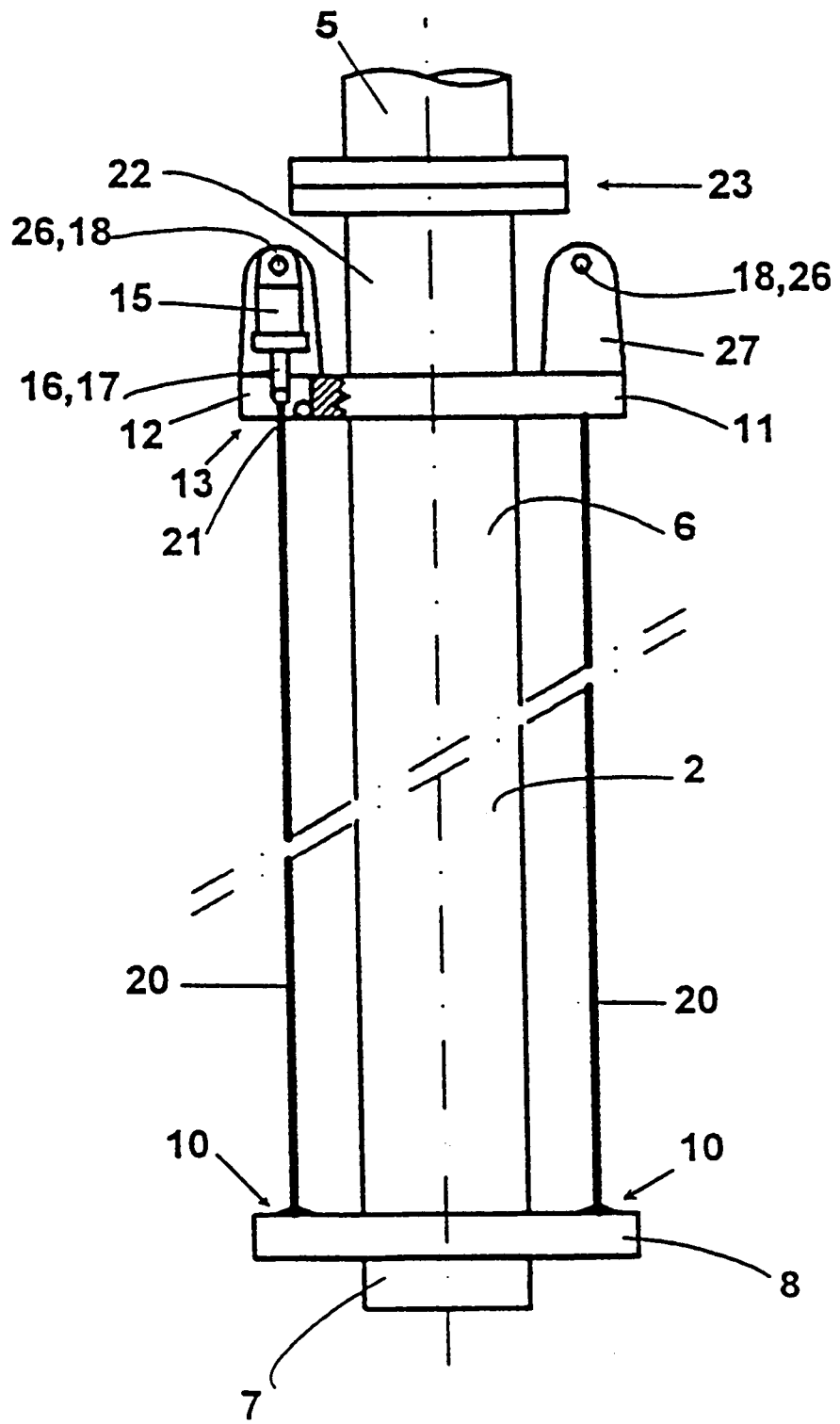
FIG. 5 shows a third embodiment of the device according to the present invention in the non-deflected condition, part of said figure being a sectional view.
Figure 6:
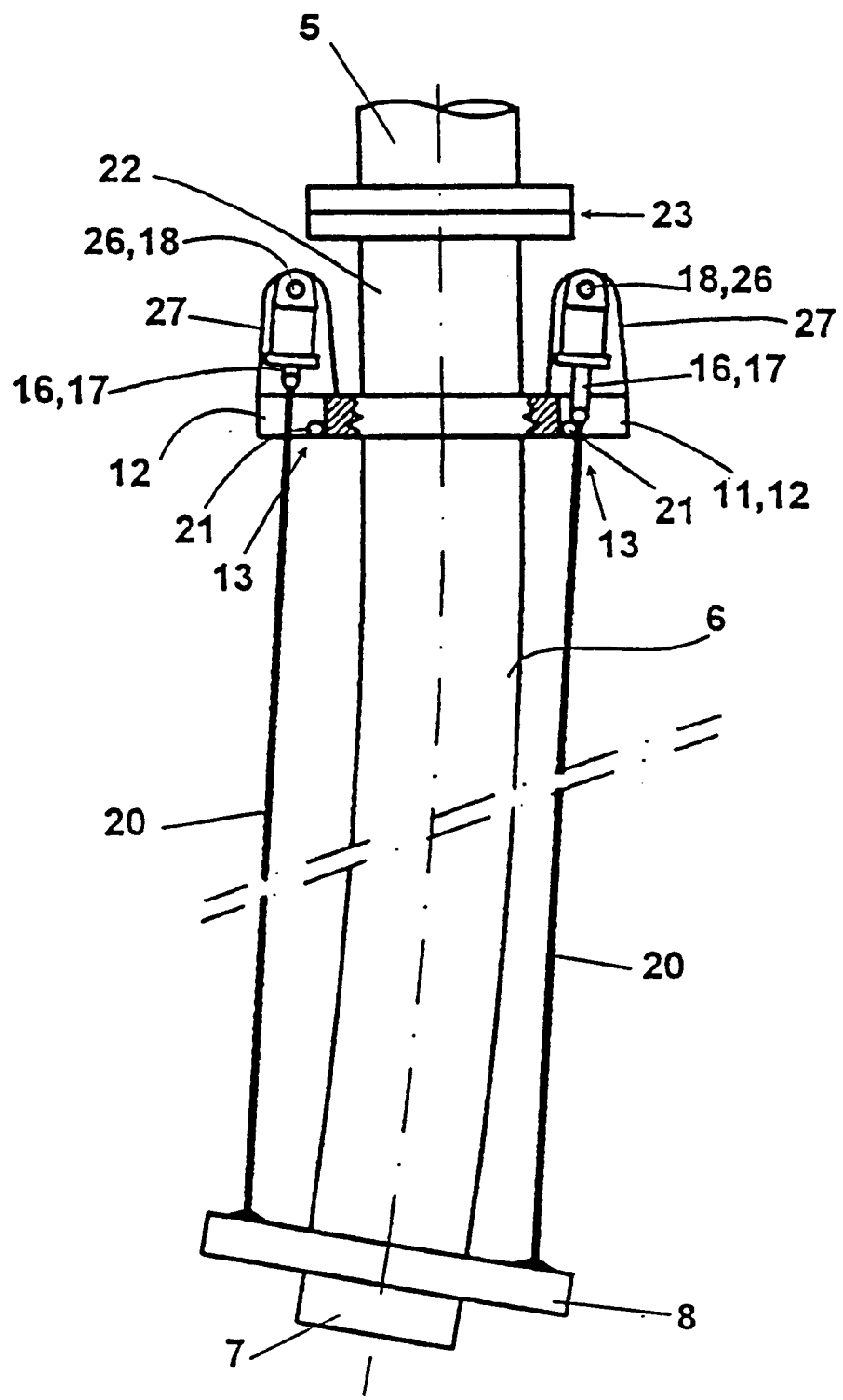
FIG. 6 shows the device according to FIG. 5 in the deflected condition.

In FIGS. 5 and 6, a further embodiment is shown, which corresponds essentially to the first embodiment. Hence, identical components are provided with identical reference numerals. Other than in the case of the first embodiment, the piston-cylinder units 15 are pivotably supported on pivoting axles 26 defining simultaneously the second bearigs 18. The pivoting axles 26 are supported in foot bearing means 27, which are secured to the second fastening ring 11.

The mode of operation of this third embodiment corresponds essentially to that of the first embodiment of the present invention. In view of the possibility of pivoting the piston-cylinder units, the draw means 20 can be guided more simply.

What is claimed is:

1. A device for discharging concrete, comprising a flexible hose (2), which is connected to a concrete supply line (5), said hose (2) being provided with an input end (6) which is associated with the supply line (5) and through which the concrete conveyed through the concrete supply line (5) enters the hose (2) and an output end (7) through which the concrete conveyed through the hose (2) leaves said hose (2) for the purpose of discharge, said hose being adapted to be bent in at least one swivelling plane between a substantially straight initial position and a curved position, and further comprising a swivelling means (3) for moving the hose (2) from its straight initial position to its curved position, said swivelling means comprising at least one drawing and/or pushing means (20) which is effective in the swivelling plane and which extends, at least at the initial position of the hose (2), outside of the longitudinal central axis of the hose (2) and at least indirectly between a first bearing (10) associated with the output end of the hose and fixedly connected to the hose (2) and a second bearing (18) associated with the input end and fixed relative to said input end at least in the drawing and/or pushing direction of the drawing and/or pushing means, and at least one actuating means being provided, which applies a drawing and/or pushing force to the drawing and/or pushing means and which is operatively connected to said drawing and/or pushing means in such a way that the distance between the first and second bearings (10, 18) can be reduced by actuating the respective actuating means, whereby the hose (2) can be moved from its initial position to its curved position, characterized in that the hose is adapted to be bent in at least two swivelling planes which are arranged at an angle relative to one another and that at least two drawing and/or pushing means (20) are provided, which are effective in the respective swivelling planes, said drawing and/or pushing means being flexible.

2. A device according to claim 1, characterized in that the swivelling planes include a right angle.

3. A device according to claim 1, characterized in that at least one of the first or second bearings (10, 18) is arranged in spaced relationship with the respective associated input end (6) or output end (7).

4. A device according to claim 1, characterized in that the respective actuating means (4) is provided between one of the bearings and the drawing and/or pushing means (20).

5. A device according to claim 1, characterized in that the respective actuating means (4) is provided between the second bearing (18) and the drawing and/ or pushing means (20).

6. A device according to claim 1, characterized in that the respective actuating means (4) is implemented as a piston-cylinder unit (15).

7. A device according to claim 1, characterized in that the respective second bearing (18) is connected to the hose (2).

8. A device according to claim 1, characterized in that the respective drawing and/or pushing means (20) extends parallel to the longitudinal axis of the hose at the initial position of the hose.

9. A device according to claim 1, characterized in that at the respective first bearing (10) is arranged laterally of and in spaced relationship with the longitudinal axis of the hose (2).

10. A device according to claim 1, characterized in that the respective second bearing (18) is arranged laterally of and in spaced relationship with the longitudinal axis of the hose (2).

11. A device according to claim 1, characterized in that additional drawing and/or pushing means (20) are provided, the bearings (10, 18) being arranged such that they are distributed over the circumference of the hose (2).

12. A device according to claim 1, characterized in that at least two drawing or pushing means (20) are provided, which, at least at the initial position of the hose (2), are arranged in opposed relationship with each other relative to the longitudinal axis of the hose (2).

13. A device according to claim 1, characterized in that three drawing or pushing means are provided, which, at the initial position of the hose, are arranged such that they are uniformly distributed about the longitudinal axis of the hose, and that the hose is adapted to be swivelled in several swivelling planes.

14. A device according to claim 1, characterized in that, at the initial position, four drawing and/or pushing means (20) are arranged such that they are uniformly distributed about the longitudinal axis of the hose, the drawing and/or pushing means (20) being arranged in pairs essentially in the swivelling planes.

15. A device according to claim 1, characterized in that the respective first bearings are attached to a first fastening ring (8) which surrounds the hose and which is secured thereto, the respective drawing and/or pushing means (20) being fixed in the bearings (10, 18).

16. A device according to claim 15, characterized in that the respective second bearings (18) are attached to a second fastening ring (11), which is fixed relative the hose (2), and that the respective actuating means (4) rest on the second fastening ring (11).

17. A device according to claim 16, characterized in that the second fastening ring (11) is provided with guide means (13) in which the drawing and/or pushing means (20) are guided such that they are adapted to be moved relative to the fastening ring (8, 11).

18. A device according to claim 17, characterized in that the guide means (13) are realized in the form of rollers (21), the drawing and/or pushing means (20) being deflected by said rollers in certain sections thereof parallel to the drawing and/or pushing direction of the piston-cylinder unit.

19. A device according to claim 1, characterized in that the device is provided with a rotating means (23) with the aid of which the hose (2) can be swivelled about its axis of symmetry relative to the supply line (5).

20. A device according to claim 1, characterized in that the drawing and/or pushing means (20) are guided in the wall (25) of the hose (2).

21. A device according to claim 1, characterized in that the drawing and/or pushing means are implemented as steel ropes.

22. A device according to claim 1, characterized in that the drawing and/or pushing means are implemented as joint rods, transmitting drawing and pushing forces.

\* \* \* \* \*